T866027

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED SEPTEMBER 30, 1969

866 O.G. 1437

805,938

ACID-CATALYZED PROCESS FOR CYCLODEHYDRATION OF SHAPED POLYHYDRAZIDE STRUCTURES

Donald Richard Wilson, Wilmington, Del., assignor to E. I. du Pont de Nemours and Company, Wilmington, Del., a corporation of Delaware

Continuation of application Ser. No. 582,531, Sept. 28, 1966. This application Feb. 14, 1969. Published Sept. 30, 1969

Int. Cl. C08g *33/04*

U.S. Cl. 260—78.4

No Drawing. 12 Pages Specification

An acid-catalyzed process for the cyclodehydration of shaped polyhydrazide structures, such as filaments, to the corresponding poly(1,3,4-oxadiazoles). The process comprises incorporating into a shaped polyhydrazide structure between about 0.1 and 5.5 mole percent of sulfonic, phosphonic, phosphonous, boronic, sulfuric or phosphoric acid, and heating the structure to a temperature of between 170° C. and the melting point of the polyhydrazide for a length of time sufficient to effect substantially complete conversion of the polyhydrazide to the corresponding poly(1,3,4-oxadiazole). Preferably, the polyhydrazide is isophthaloyl terephthaloyl copolyhydrazide and the acid is benzenesulfonic acid. Preferably, the structure is heated at a temperature of between 250° and 320° C.